United States Patent [19]

Katzfey

[11] 4,361,852

[45] Nov. 30, 1982

[54] SIGNAL PROCESSING CIRCUIT FOR VIDEO SIGNAL WITH BURIED AUDIO SIGNAL

[75] Inventor: Lance J. Katzfey, San Diego, Calif.

[73] Assignee: Sony Corporation, Tokyo, Japan

[21] Appl. No.: 191,764

[22] Filed: Sep. 29, 1980

[51] Int. Cl.³ ............................................. H04N 7/08
[52] U.S. Cl. .................................................. 358/145
[58] Field of Search ................. 358/12, 141, 143, 144, 358/145, 146, 147, 198; 360/8, 9

[56] References Cited

U.S. PATENT DOCUMENTS

| | | | |
|---|---|---|---|
| 3,506,780 | 4/1970 | Camras | 358/145 |
| 3,819,852 | 6/1974 | Wolf | 358/145 |
| 3,855,424 | 12/1974 | Tharmaratnam | 360/9 |
| 4,266,243 | 5/1981 | Shutterly | 358/145 |

OTHER PUBLICATIONS

Gassmann, "Twelve Sound Channels During the Vertical Sync Internal of the Television Signal", IEEE Trans Broadcast and Television Receivers, vol. BTR-16, No. 4, Nov. 1970, pp. 318-324.

*Primary Examiner*—Michael A. Masinick
*Attorney, Agent, or Firm*—Lewis H. Eslinger; Alvin Sinderbrand

[57] ABSTRACT

An audio signal is time-compressed and injected as a buried audio signal into one or more selected line-scanning periods of a video signal, preferably during the vertical blanking portion of each field period. An encoding circuit for performing this function includes a memory device and a clock generator for providing to the memory device a high-speed clock signal during the selected line-scanning periods of each field period, and a low-speed clock signal during the remainder of the video signal. In the encoding circuit, a continuous audio signal is written into the memory device at low speed during substantially all of each field period and is read out therefrom at high speed during the selected line-scanning periods as a buried audio signal. In a complementary decoding circuit, the buried audio signal is written into a memory device at high speed during the selected line-scanning period and is read out therefrom at low speed during the remainder of each field period to reconstruct a substantially continuous audio signal. The memory device can be an analog device such as a CCD shift register, or can be a digital memory with associated A/D and D/A converters.

16 Claims, 22 Drawing Figures

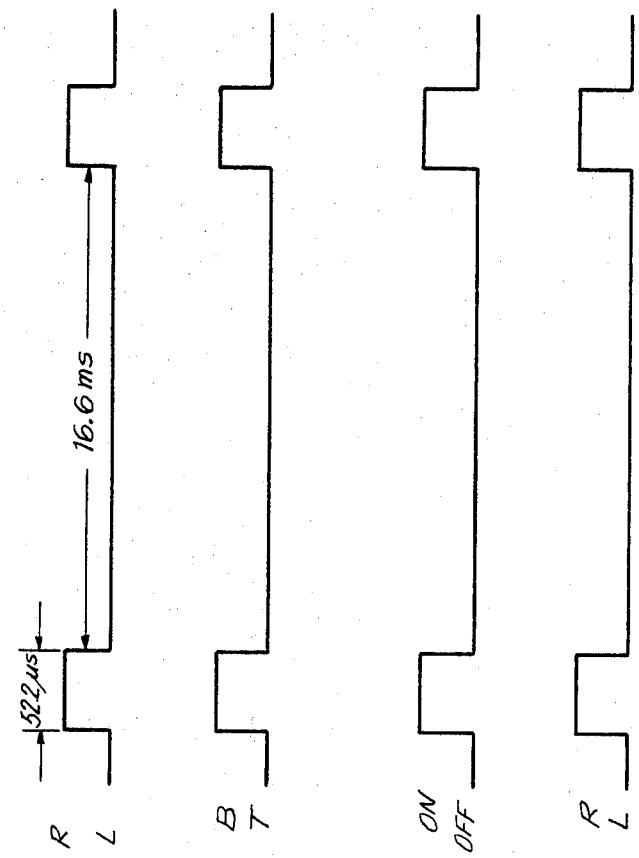

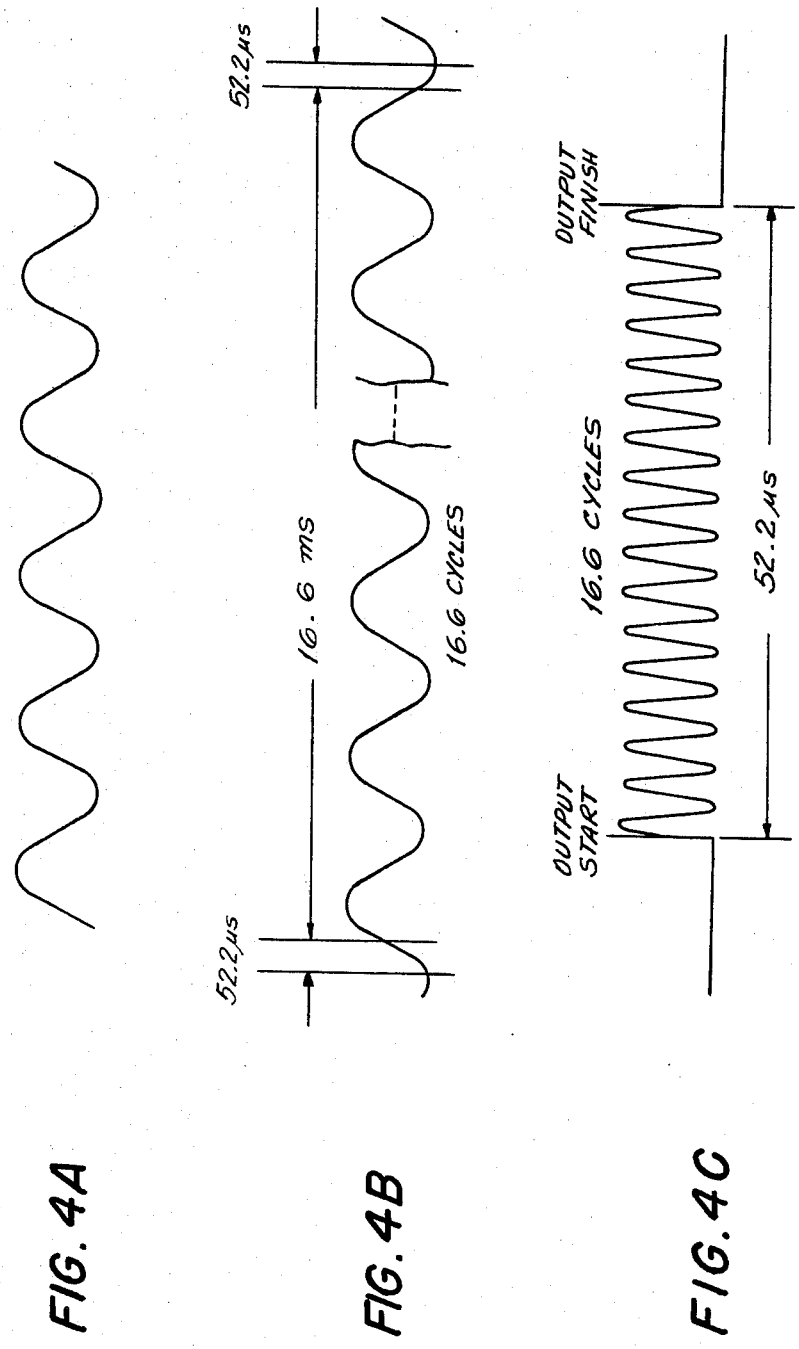

STEREO ENCODE

DECODER

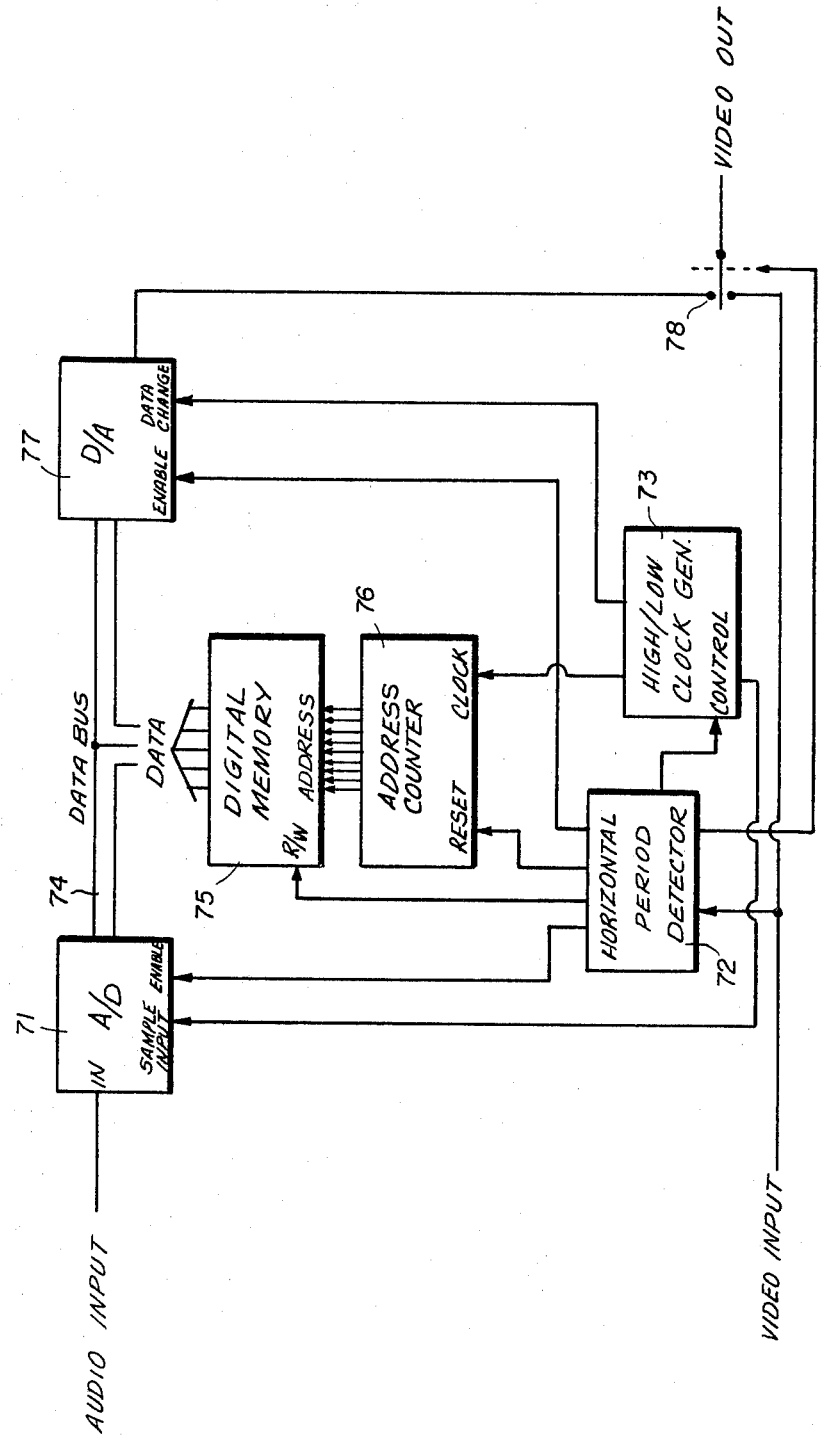
FIG.10 DIGITAL MEMORY ENCODER

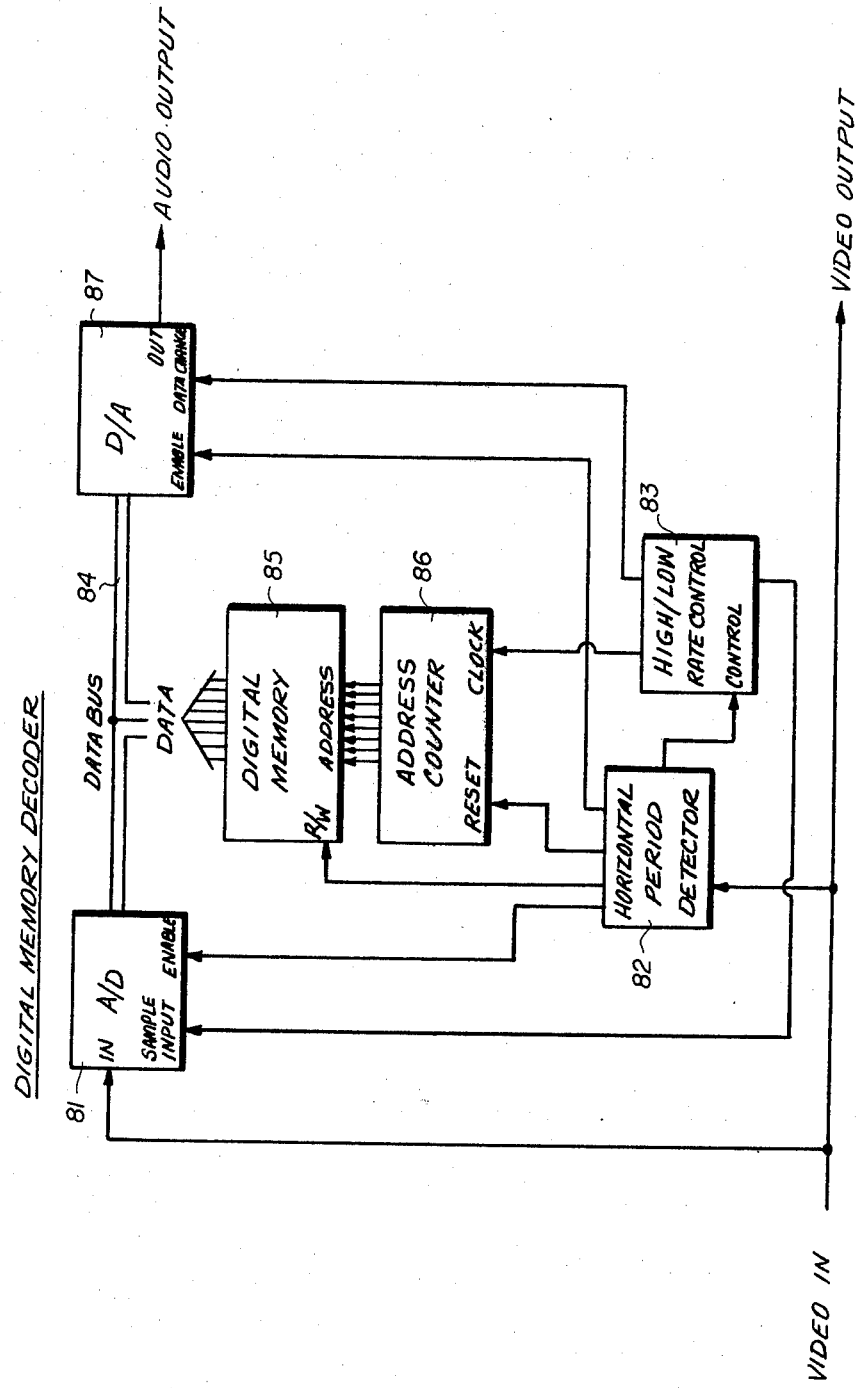

SIGNAL PROCESSING CIRCUIT FOR VIDEO SIGNAL WITH BURIED AUDIO SIGNAL

BACKGROUND OF THE INVENTION

1. Field of the Invention

This invention relates to a video signal processing circuit, and in particular, relates to a circuit by means of which an audio signal is injected into one or more line-scanning periods of the video signal as a time-compressed, buried audio signal.

2. Brief Description of the Prior Art

In conventional television systems, such as the NTSC system, in conventional television receivers, and in conventional video recorders, the audio signal and the video signal are processed separately. As a result, the bandwidth required for the television signal must be sufficient to accommodate both the audio signal and the video signal.

However, in a conventional video signal, there are provided between eight and twelve unused horizontal, or line-scanning periods occurring during the vertical blanking portion of each field period. Although any one such line-scanning period is sufficient to contain all of the audio information required for a given field period, it has heretofore not been possible to inject the audio signal into the unused line-scanning periods, and to later recover the audio signal from such line-scanning periods.

OBJECTS AND SUMMARY OF THE INVENTION

It is an object of this invention to provide a circuit for processing a composite signal formed of an audio signal and a video signal in which the audio signal is time-compressed and injected into the video signal to occur in a selected line-scanning period in at least certain field periods thereof.

It is another object of this invention to provide a circuit for processing a composite signal in which the audio signal is written into a memory at a low clocking frequency during substantially an entire video field, and is read out therefrom at a greater frequency during the selected line-scanning period.

It is yet another object of this invention to provide a circuit for processing a composite signal in which a buried audio signal occurs in at least one selected line-scanning period of at least certain field periods.

It is a yet further object of this invention to provide a circuit for processing such a composite signal in which the buried audio signal is written into a memory at a high clocking rate during the selected line-scanning period, and is read out therefrom at a lower clocking rate to provide a substantially continuous audio signal.

It is an additional object of this invention to provide a circuit for processing a composite signal which permits the elimination of a separate audio transmission channel.

It is still another object of this invention to provide a circuit for processing a composite signal in which two or more audio signals can be time-compressed and buried into the video signal.

It is yet still another object of this invention to provide a circuit for processing a composite signal which enables the video signal to be accompanied by a stereo audio signal without increasing the transmission bandwidth of the composite signal.

According to an aspect of this invention, a circuit for processing a composite signal formed of an audio signal and a video signal having a series of field periods each constituted by a sequence of line-scanning periods, comprises a video channel for processing the video signal; an audio channel for processing the audio signal including a memory device to which the audio signal is written in and from which the audio signal is thereafter read out at a speed depending on the frequency of a clocking signal applied thereto; a clock signal generator for generating a first clocking signal at a first clocking frequency and a second clocking signal at a second, higher clocking frequency; a clock control signal for selectively applying the second clocking signal to the memory device during one or more selected line-scanning periods of at least certain field periods and for selectively applying the first clocking signal to the memory device during the remainder of the line-scanning periods, so that the audio signal is read into the memory device at the first clocking frequency during substantially all of each field period, and the written-in audio signal is read out from the memory device at the second clocking frequency only during the selected line-scanning period or periods; and an output for combining the video signal with the read-out audio signal to form a composite output signal in which the audio signal information occurs in the selected line-scanning periods of the video signal. Preferably, the selected line-scanning period occurs during the vertical blanking portion of each field period, and the first and second clocking frequencies are selected substantially in the ratio of the field period duration to the line-scanning period duration. However, because the line-scanning periods each have a blanking portion and a line-scanning portion, and the audio signal information in the composite output signal preferably occurs during the line-scanning portion of the selected line-scanning period, the first and second clocking frequencies are preferably selected in the ratio of the duration of the line-scanning portion to the duration of the remainder of the line-scanning periods for each field period. The memory device can include an analog shift register, or can include a digital memory together with associated A/D and D/A converters.

According to another aspect of this invention, a circuit for processing a composite signal formed of a video signal having a series of field periods each constituted by a sequence of line-scanning periods and of a buried audio signal occurring in at least one selected line-scanning period of at least certain field periods, comprises an audio channel for receiving and processing the buried audio signal to yield a substantially continuous audio signal, including a memory device to which the buried audio signal is written in and from which the substantially continuous audio signal is thereafter read out at a speed depending on the frequency of a clocking signal applied thereto; a clock signal generator for generating a first clocking signal at a first clocking frequency and a second clocking signal at a second, higher clocking frequency; and a clock control circuit for selectively applying the second clocking signal to the memory device during the selected line-scanning period or periods and for selectively applying the first clocking signal to the memory device during the remainder of the line-scanning periods, so that the buried audio signal is read into the memory device at the second clocking frequency during the selected line-scanning period or periods and the written-in buried audio signal is read out of the memory device during substantially all of each field period to yield the continuous audio signal. The circuit can further include a one-field delay line for imparting a delay of one field to the video signal, so that the audio signal and the displayed video picture corresponding to the video signal are synchronized with one another.

According to yet another aspect of this invention, a video processing circuit for use with a recording and/or playback device for recording and/or and playing back a composite signal formed of an audio signal and a video signal having a series of field periods each constituted by a sequence of line-scanning periods comprises an audio input for receiving the audio signal to be recorded; a first video input for receiving the video signal to be recorded; a second video input for receiving a played back video signal from the recording and/or playback device; a first output for applying the video signal to the recording and/or playback device; a second output for applying at least a portion of the audio signal to an output video device, such as a television receiver; an audio channel for processing the audio signal including a memory device to which the audio signal is written in and from which the audio signal is thereafter read out at a speed depending on the frequency of a clocking signal applied thereto, means for coupling the audio input to the memory device during recording, and means for coupling the second video input to the memory device during playback; a clock signal generator for generating a first clocking signal at a first clocking frequency and a second clocking signal at a second, higher clocking frequency; a clock control circuit for selectively applying the second clocking signal to the memory device during one or more selected line-scanning periods of at least certain field periods and for selectively applying the first clocking signal to the memory device during the remainder of the line-scanning periods so that during recording, the audio signal is read into the memory device at the first clocking frequency during substantially all of each field period and the written-in audio signal is read out from the memory device as a time-compressed audio signal at the second clocking frequency only during the selected line-scanning periods, while during playback the time-compressed audio signal is written into the memory device at the second clocking frequency only during the selected line-scanning period and the written-in time-compressed audio signal is read out from the memory device at the first clocking frequency during substantially all of each field period as a continuous output audio signal; and a coupling circuit for selectively coupling the memory device to the first output during recording and to the second output during playback; with the first output being operative to combine, during recording, the video signal with the time-compressed audio signal to form a composite output signal in which the audio signal information occurs in the selected line-scanning periods of the video signal.

The above and other objects and features of the invention will be apparent from a consideration of the following description, when read in conjunction with the accompanying drawings.

BRIEF DESCRIPTION OF THE DRAWINGS

FIGS. 3A–3D and 4A–4F show examples of signals which are useful in explaining the operation of the circuits of FIGS. 1 and 2.

FIGS. 10 and 11 show alternative arrangements of the memory devices of the circuit shown in FIGS. 1 and 2, respectively.

DETAILED DESCRIPTION OF THE PREFERRED EMBODIMENTS

Figure 1:
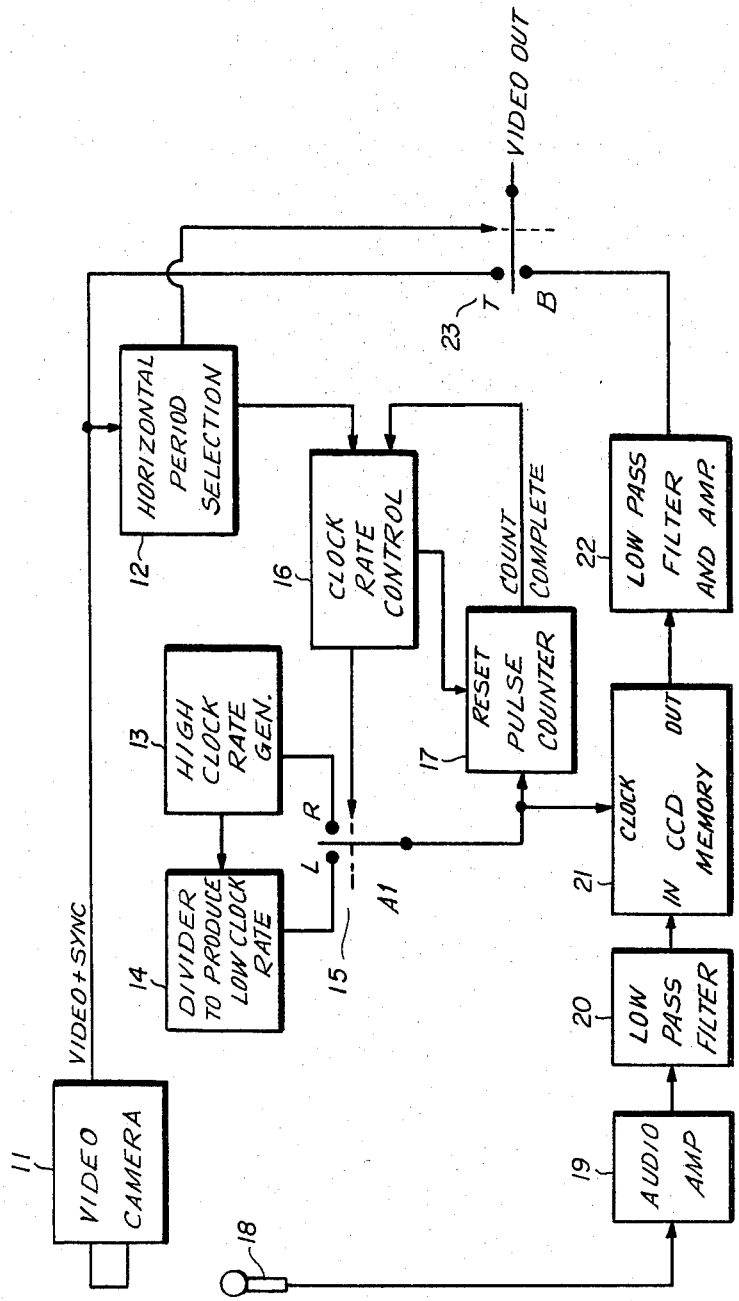
FIG. 1 is a diagram of an encoding circuit according to the present invention.

Referring to the drawings, FIG. 1 thereof illustrates a processing circuit for encoding the audio portion of a television signal, and providing an output signal in which the audio signal information occurs as a "buried" audio signal during a selected line-scanning period of the video signal. Throughout this specification, the term "encoding" is used to mean the process of time-compressing an audio signal and inserting it as a buried signal in one or more of the unused line scanning periods of the video signal. Similarly, the term "decoding" is used to refer to the complementary process of time-expanding the buried signal derived from the video signal, and restoring a substantially continuous audio signal.

In FIG. 1, a video camera 11 provides a video signal, together with the appropriate horizontal and vertical synch signals. A horizontal period selector 12 detects the occurrence of a predetermined horizontal or line-scanning period during each field period. Selector 12 can include, for example, a counter which begins counting at the occurrence of the vertical synch signal of each field, and provides a control signal when a predetermined number of horizontal synch signals have occurred following the vertical synch signal.

A clock generator 13 provides relatively high-speed clocking signals $S_H$ and furnishes these clocking signals to a divider 14 which in turn provides relatively low-speed clocking signals $S_L$. A selector switch 15, controlled by a clock rate control circuit 16, is selectively coupled at one terminal R thereof to generator 13 to pass the high-frequency clocking signals $S_H$ and at another terminal L thereof to divider 14 to pass the low-frequency clocking signals $S_L$. A pulse counter 17, which receives clock pulses from selector switch 15 and is coupled at a reset terminal thereof to clock rate control circuit 16, provides a "count-complete" signal to clock rate control circuit 16 to indicate that a predetermined number of pulses have been counted, so that the latter will cause selector switch 15 to switch over to divider 14 after a predetermined number of high-speed clocking signals $S_H$ have been counted.

An input audio signal is provided from an input device 18, such as a microphone, to an audio channel including an audio amplifier 19, an input low pass filter 20, an analog memory 21 and an output low pass filter and amplifier 22. Analog memory 21 can be charge-coupled-device (CCD) shift register, such as a Fairchild CCD321 910-bit analog shift register, which is readily available. Clocking signals $S_H$ and $S_L$ are provided from selector switch 15 to a clocking input of analog memory 21. Finally, a video output selector switch 23 is coupled at one terminal T to camera 11 and at another terminal B to low pass filter and amplifier 22. Switch 23 is controlled by horizontal period selector 12 to interleave the audio signal provided from low pass filter and amplifier 22 with the video signal from video camera 11 to provide an output composite signal in which the audio information is contained in a predetermined line-scanning period of the video signal as a time-compressed buried audio signal.

Figure 2:
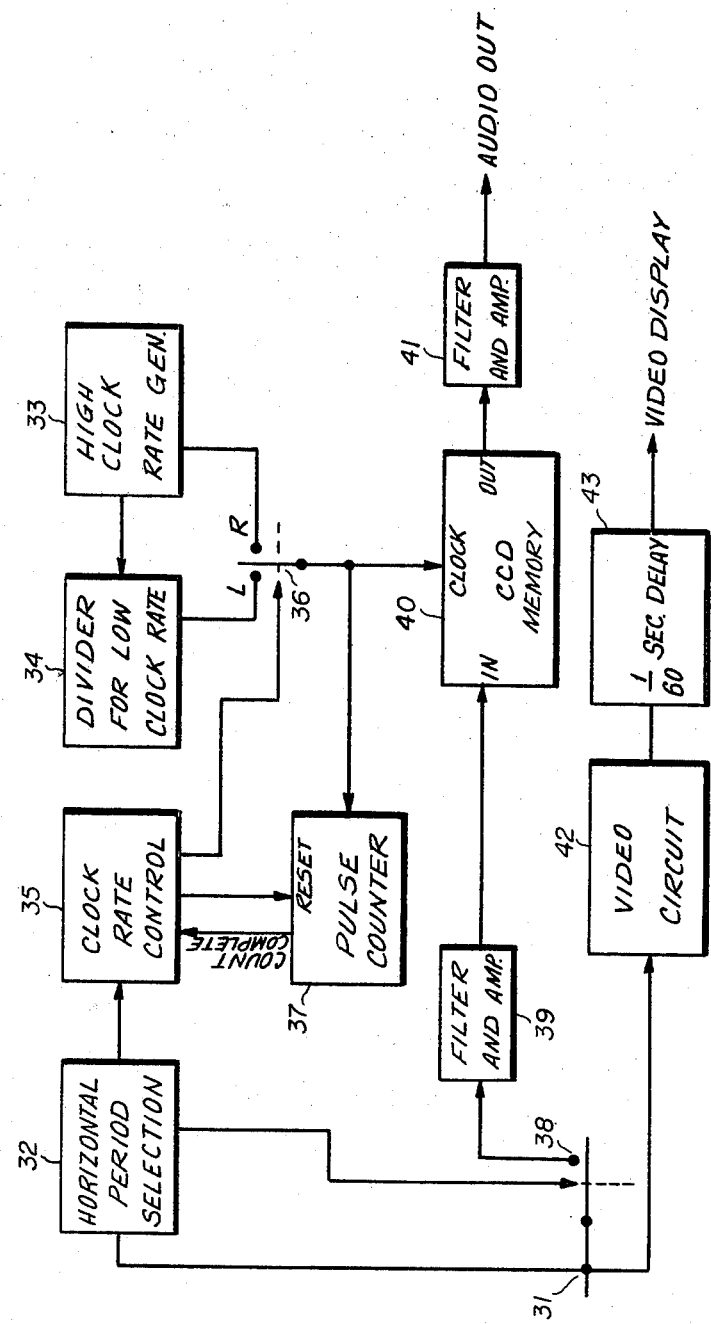
FIG. 2 is a diagram of a decoding circuit according to the present invention, complementary to the circuit of FIG. 1.

FIG. 2 shows a signal decoding circuit according to this invention which is complementary to the encoding circuit of FIG. 1. A video input 31 is coupled to a horizontal period selector 32. A clock signal generator 33 provides high-speed clocking signals $S_H$, and a divider 34 coupled therewith provides low-speed clocking signals $S_L$. A clock rate control circuit 35 coupled to horizontal period selector 32 controls a selector switch 36 which is selectively actual between terminals L and R thereof to pass the low- and high-frequency clocking signals $S_L$ and $S_H$ from divider 34 and clock generator 33, respectively. These clocking signals are furnished to a pulse counter 37 which is reset by clock rate control circuit 35 and which furnishes thereto a "count-complete" signal following a predetermined number of high-speed clocking signals $S_H$. An audio input switch 38 controlled by horizontal period selector 32 furnishes the buried audio signal occurring during the selected line-scanning portions of the video signal to an audio channel including filter and amplifier 39, an analog memory 40, and a filter and amplifier 41. Video input 31 is also coupled to a video processing circuit 42, which is of a conventional nature, and which is followed by a one-field delay line 43 which serves to match the timing of the reproduced audio with the displayed picture corresponding to the video signal, and is included for reasons to be discussed below.

The operation of the encoding and decoding circuits of FIGS. 1 and 2 can be explained in conjunction with the signals shown in FIGS. 3A–3D and FIGS. 4A–4F.

The basic operation of the circuit of FIG. 1 operates to convert the normal audio signal into a buried signal which is injected into one or more of the line-scanning periods of the video signal. Preferably, one or more of the unused horizontal periods available during the vertical blanking can be used to accommodate the buried audio signal. In order to achieve this, it is necessary to time-compress the audio signal so that the audio signal information corresponding to one field period (1/60 of a second) will fit into one line-scanning period, 63.5 μs. This time-compression, and the corresponding complementary time-expansion in the decoding circuit of FIG. 2, can be achieved by means of an analog memory, such as a CCD shift register, by varying the rate of the clocking signals applied thereto. In the ensuing description, it is assumed that it is desired to bury the audio signal into a single line-scanning period during each field. In the NTSC system, the line-scanning period is 63.5 μs, and the horizontal blanking pulse associated therewith has a duration of 11 μs. This means that the read-out period, i.e., the maximum time available for signal transmission from memory 21, is 52.5 μs. The field frequency is 60 Hz, meaning that the write-in period, i.e., the time available for writing the audio signal into memory 21 will be 1/60 sec-52.5 μs, or 16.6 ms.

The ratio of the write-in period to the read-out period for the encoding circuit of FIG. 1 is 16.6 ms/52.5 μs=316.2. However, because the read-out period of 52.5 μs is a maximum value, the ratio can be chosen to be somewhat larger than 316.2. Further, because it is convenient to use a divider, such as divider 14 to provide the low-speed clocking signals, in the embodiments of FIGS. 1 and 2, the ratio of write-in period to read-out period should be a whole number and is conveniently selected as 318. Thus, in the described embodiment, the read-out period is equal to (16.6 ms/318)=52.2 μs.

In the NTSC system, a video bandwidth of 3.5 MHz can be assumed. The maximum frequency $F_{max}$ of the input radio signal to be applied to the input of memory 21 is equal to the video bandwidth divided by the above-mentioned ratio; that is, $F_{max}=(3.5\text{ MHz}/318)=11,006$ Hz, which is sufficient for most audio signals which would accompany a transmitted video signal. However, if a higher maximum input frequency $F_{max}$ is required, two horizontal periods per field could be used for the buried audio signal to effectively double the maximum frequency $F_{max}$ to 22,012 Hz.

The Nyquist criteria for sampling an analog waveform require that the sampling rate must be at least twice the maximum frequency in the input waveform. Therefore, the minimum number of samples $N_M$ within a given 16.6 ms period will be $N_M=2\times 11,006\times 0.0166=365.4$. However, because $N_M=365.4$ represents a minimum value, it is convenient to use a 910-sample CCD memory, such as the Fairchild CCD 321, which is readily available. With such a memory, the high-speed clocking signal $S_H$ required to be applied to memory 21 during the selected line-scanning interval for reading out the buried audio signal will have a frequency calculated as $910/52.2\ \mu s=17,432,950$ Hz. Consequently, the low-speed clocking signal $S_L$ to be applied to memory device 21 during the remaining portion of each field period for writing the audio signal therein will have a frequency $(17,432,950/318)=54,820$ Hz.

In view of the foregoing parameters, the operation of the circuit of FIG. 1, together with the complementary operation of the circuit of FIG. 2 can be easily explained.

As shown in FIG. 3A, whenever horizontal period selector 12 detects the occurrence of a predetermined line-scanning interval within each field period, it causes clock rate control circuit 16 to actuate switch 15 to contact terminal R to furnish high-speed clocking signals $S_H$ therefrom, and also causes clock rate control circuit 16 to analyze a reset signal to pulse counter 17. Pulse counter 17 then begins to count the occurrences of clocking signal $S_H$, and when counter 17 attains a count of 910, it furnishes the "count-complete" signal to clock rate control circuit 16 to indicate that the 52.2 μs read-out period has ended, and thus to change over selector switch 15 to terminal L to furnish low-speed clocking signals $S_L$. Also, during the selected line-scanning period, horizontal period selector 12 causes output switch 23 to switch over to terminal B to couple switch 23 with the audio channel 19–22, and thereafter to change switch 23 back to terminal T to furnish video and synch signals to the video output during the remaining portions of each field period. Thus, as shown in FIGS. 3A and 3B, signals are provided to actuate switches 15 and 23, respectively, for one interval of 52.2 μs during each field period, and to return the switch for a 16.6 ms interval corresponding to the remainder of each field period. As shown in FIGS. 3C and 3D, in the decoding circuit of FIG. 2, the horizontal period selector 32 closes audio input switch 38 for a 52.2 μs period when the selected line-scanning period is detected, and clock rate control circuit 35 switches over switch 36 to terminal R to select high-speed clocking signals $S_H$ during this 52.2 μs period, and then switches switch 36 back to terminal L for a 16.6 ms period, corresponding to the remaining line-scanning portions of each field period.

The particular encoding and decoding operations can now be discussed with reference to FIGS. 4A–4F.

Audio input device 18 provides to amplifier 19 an audio input analog signal, here, for simplicity, as shown in FIG. 4A, a 1 KHz, 0dBm standard test tone. As shown in FIG. 4B, this input analog signal is applied to analog memory 21 for a series of 16.6 ms periods separated by 52.2 μs periods. It is apparent that since the input sampling rate is the same as the frequency of the low-speed clocking signal $S_L$, i.e., 54.82 KHz, each cycle of the 1 KHz audio tone is sampled 54.82 times. Upon the detection by horizontal period selector 12 of the selected line-scanning period, the analog audio signal which has been written into memory 21 is read out therefrom at the frequency of the high-speed clocking signal $S_H$, i.e., 17.433 MHz. This read-out signal, as shown in FIG. 4C, is combined with the audio signal at output switch 23 as a buried audio signal occurring within the selected line-scanning period.

Figure 4D:
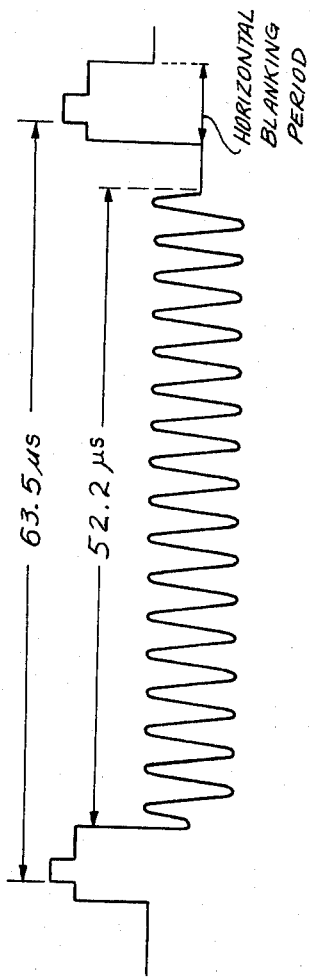
Figure 4E:
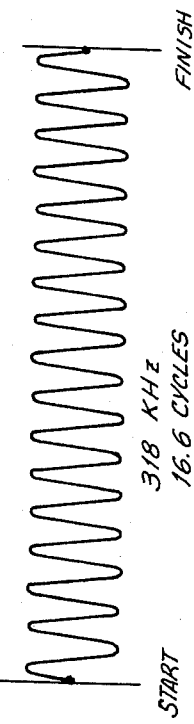

As shown in FIG. 4D, in the decoding circuit of FIG. 2, whenever horizontal period selector 32 detects the trailing edge of the horizontal blanking signal of the selected line-scanning period, high-speed clocking signals $S_H$ are applied to the clocking terminal of analog memory 40 to write in thereto the buried audio signal as shown in FIG. 4E. Then, at the time 52.2 μs from that trailing edge, low-speed clocking signals $S_L$ are applied to the clocking terminal of analog memory 40, and the latter then provides the 16.6 cycles of the buried audio signal at a 1 KHz rate through filter and amplifier 41 to an audio output.

Figure 4F:
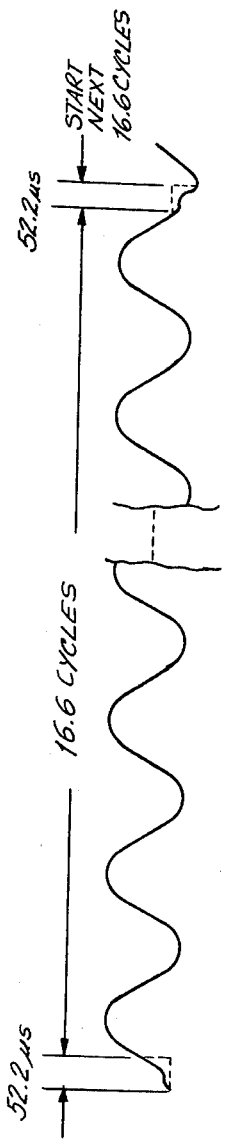

As shown in FIG. 4F, consecutive 16.6 ms segments of the audio signal representing the audio signal occurring during adjacent fields, are joined together to form a substantially continuous signal. However, it is noted that 52.2 μs gaps separate the 16.6 ms blocks of the audio signal, thereby resulting in a small amount of distortion, as shown in dash lines in FIG. 4F. However, because this distortion is very small and has frequency components at 60 Hz, 19 KHz, and harmonics thereof, the resulting distortion can be easily filtered out, and will not be objectionable, The 60 Hz component can be easily filtered out to provide a substantially distortion-free output signal as shown in solid lines in FIG. 4F, and the higher frequency components can be filtered out by means of any convenient low pass filter.

Because the process of burying the audio signal and later restoring the buried audio signal to its original form delays the audio by one field period, the circuit shown in FIG. 2 includes 1/60 second delay 43 to match the timing of the audio with the corresponding displayed image. However, a 1/60 second delay in the audio would not be noticeable, and delay 43 can be omitted.

Figure 5:
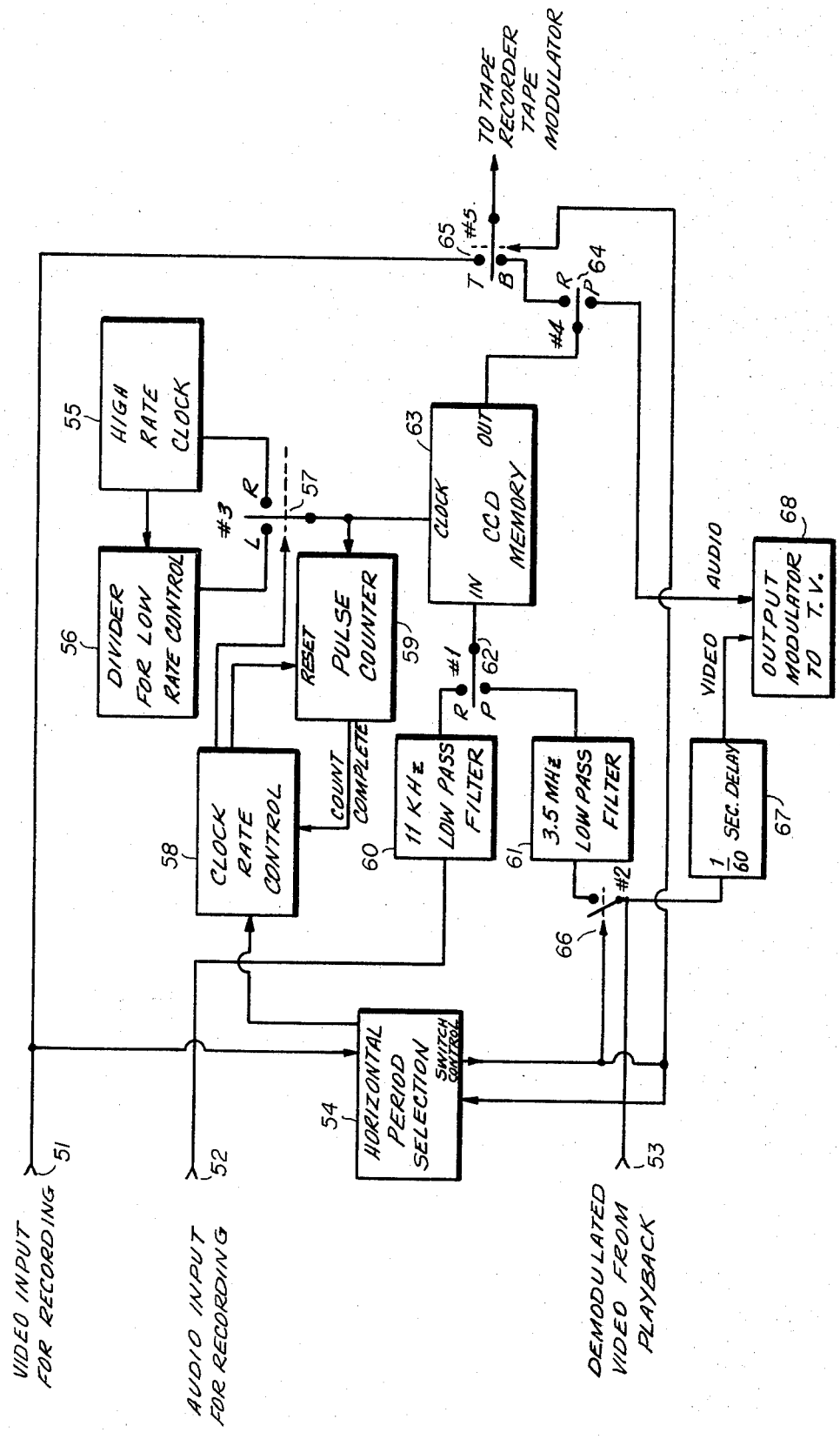
FIG. 5 shows a circuit according to this invention for use with a recording and/or playback device.

FIG. 5 illustrates an alternative embodiment of the present invention designed for use with a video recording and/or playback apparatus, such as a VTR, a video disc system, or the like. In the device of FIG. 5, a video output 51 and an audio input 52 receive input video and audio signals, respectively, prior to recording thereof. A playback video input 53 receives a demodulated video signal from the recording and/or playback apparatus. Video input 51 and playback video input 53 are both coupled to a horizontal period selector 54 which is similar to those of the embodiment of FIGS. 1 and 2. Also, a high-frequency clock 55 furnishes high-frequency clocking signals $S_H$ to a divider 56 and to one input terminal R of a selector switch 57. Divider 56 provides low-frequency clocking signals $S_L$ to another terminal L of switch 57. Horizontal period selector 54 provides a signal indicating the occurrence of the selected horizontal or line-scanning period to a clock rate control circuit 58 which, together with pulse counter 59, controls the actuation of switch 57, in a manner as described above in respect to the circuits of FIGS. 1 and 2. An 11 KHz low pass filter 60, coupled to audio input 52 and a 3.5 MHz playback low pass filter 61 are respectively coupled to a record terminal R and to a playback terminal P of a record/playback switch 62, which is coupled to an input terminal of an analog memory 63. Another record/playback switch 64 couples the output of memory 63 to a record terminal R and a playback terminal P thereof. An output switch 65 is selectively coupled at a terminal T thereof to the video input and at a terminal B thereof to terminal R of switch 64. A control signal supplied from horizontal period selector 54 controls the actuation of output switch 65. A buried audio input switch 66 also controlled by a signal from horizontal period selector 54 couples the modulated playback video input 53 to playback low pass filter 61. Playback input 53 is also coupled through a 1/60-second delay 67 to a video input of an output modulator 68. Playback terminal P of switch 64 is coupled to an audio input terminal of modulator 68.

Figures 6A, 6B, 6C, 6D:
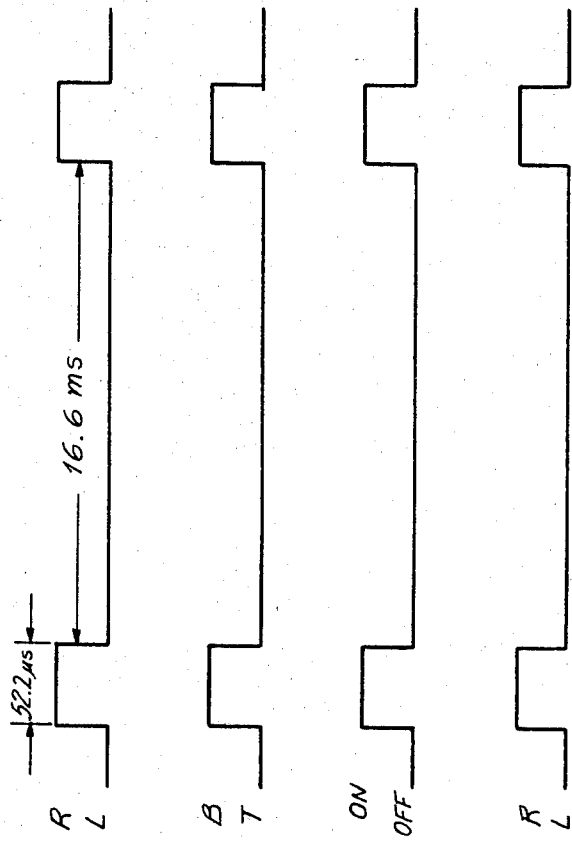
FIGS. 6A–6D show examples of signals which are useful in explaining the operation of the circuit of FIG. 5.

During a record operation, record/playback switches 62 and 64 are switched over to their respective terminals R. The audio input signal provided to audio input terminal 52 is continuously provided to the input terminal of analog memory 63. Similarly to the embodiment of FIG. 1, switch 57 is normally contacted to its terminal L to provide low-speed clocking signals $S_L$ to the clocking terminal of memory 63, so that the analog audio input signal is written into memory 63 during a 16.6 ms period. Then, when horizontal period selector 54 detects the occurrence of the selected line-scanning period, switch 57 is switched over to contact its terminal R to furnish high-speed clocking signals $S_H$ for a 52.2 μs period, and thereafter returns to contact L thereof, as shown in FIG. 6A. During the selected line-scanning period, the written-in analog signal is read out from memory 63 as a time-compressed audio signal. During the same 52.5 μs period, as shown in FIG. 6B, output switch 65 is moved to its terminal B, and thereafter is returned to its terminal, so that the time-compressed audio signal is inserted into the line-scanning portion of the selected line-scanning period. Thus, a video signal having a buried audio signal contained therein is provided from output switch 65 to the recording section of a recording and/or playback apparatus.

For a reproducing, or playback operation, switches 62 and 64 are switched over to their respective terminals P. Horizontal period selector 54 then detects the occurrence of the selected line-scanning period occurring in the demodulated video applied to playback video input 53, and closes switches 66 during a 52.2 μs interval following such detection, as shown in FIG. 6C. At the same time, during the selected line-scanning period, switch 57 is actuated to contact its terminal R, as shown in FIG. 6D. Thus, during the selected line-scanning period, the buried audio signal contained therein is applied through low pass filter 61 to the input terminal of the analog memory 63 and written in at the rate of high-speed clocking signals $S_H$. Then, following the 52.2 μs period, as shown in FIG. 6D, switch 57 is returned to contact its terminal L to furnish low-speed clocking signals $S_L$ to analog memory 63. Thus, during the 16.6 ms period following the selected line-scanning period, the buried audio signal which is written into memory 63 is read out therefrom at the frequency of low-speed clocking signals $S_L$ to restore the audio signal to a form which is compatible with any device to which output modulator 68 can be connected.

Figure 7:
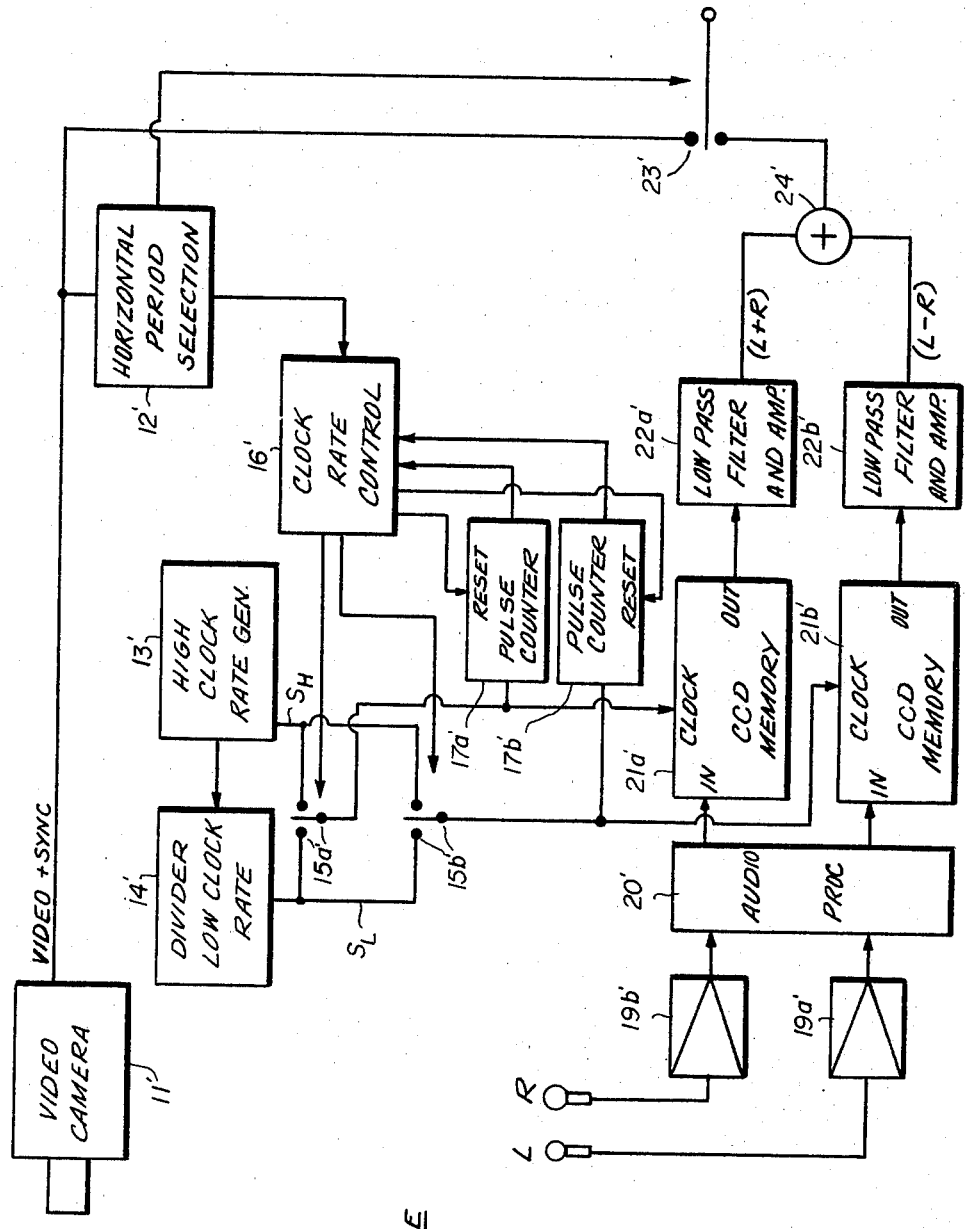
FIGS. 7 and 8 are encoding and decoding circuits, respectively, according to this invention, for processing a two-channel audio signal.
Figure 8:
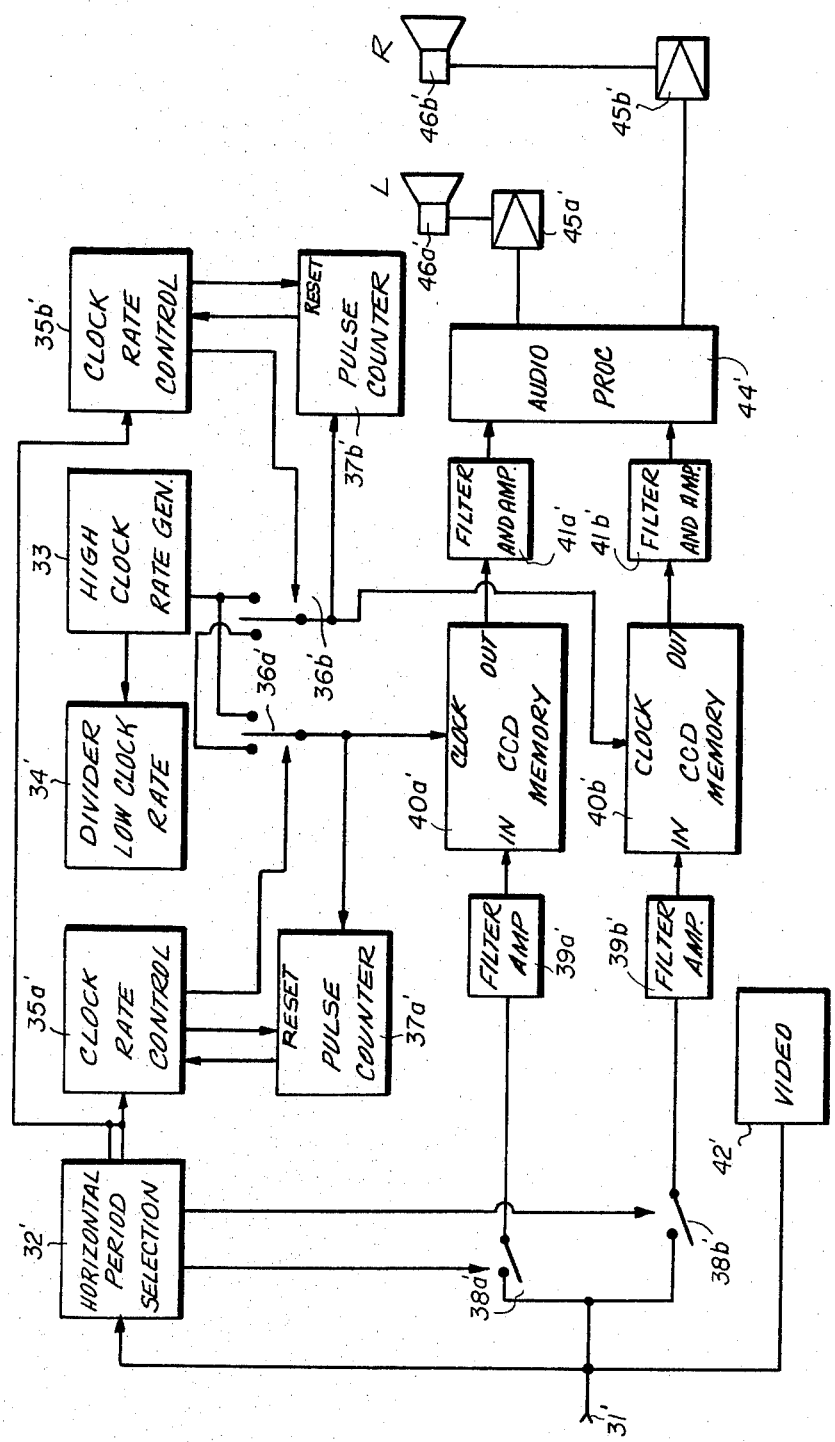

FIGS. 7 and 8 respectively show encoding and decoding circuits according to this invention, for processing a two-channel audio signal, such as a stereo signal. In FIGS. 7 and 8, elements similar to those in the embodiments shown in FIGS. 1 and 2 are identified with the same reference numerals, but primed, and a detailed description thereof is omitted.

In the embodiment of FIG. 7, horizontal period selector 12' detects the occurrence of first and second selected line-scanning periods in each video field and thereby causes clock rate control circuit 16' to actuate switches 15a' and 15b' to furnish high-speed clocking signals $S_H$ during the first and second line-scanning periods, respectively, and to furnish the low-speed clocking signals $S_L$ at other times. Separate pulse counters 17a' and 17b' are used to determine the length of the 52.2 μs periods occurring during the first and second selected line-scanning periods, respectively. In the embodiment shown in FIG. 7, audio inputs 18a' and 18b' are respectively coupled through amplifiers 19a' and 19b' and an audio processor 20' to first and second analog memories 21a' and 21b'. Here, the two analog signals are left and right channels of a stereo signal, and audio processor 20' includes matrixing circuitry to transform the left and right channels into a sum L+R stereo signal and a difference L−R stereo signal to be applied to input terminals of memory 21a' and memory 21b', respectively. The analog memories 21a' and 21b' thus each provide a time-compressed audio signal, during the respective first and second selected line-scanning periods, through low pass filters and amplifiers 22a' and 22b' to a combining circuit 24, and the time-compressed audio signal is thence furnished to output switch 23' to be combined as a buried audio signal in the first and second selected line-scanning period of the video signal.

The complementary two-channel decoding circuit according to this invention, as shown in FIG. 8, has first and second clock rate control circuits 35a' and 35b' and associated pulse counters 37a' and 37b' which control the actuation of first and second selector switches 36a' and 36b'. Thus, upon receiving the video signal containing a two-channel buried audio signal contained in first and second selected line-scanning periods, horizontal period selector 32' first actuates clock rate control circuits 35a' and 35b' during the first and second selected line-scanning periods, respectively. Selector 32' also closes switches 38a' and 38b' during the respective first and second selected line-scanning period, to furnish the buried audio signal associated with one channel to memory device 40a' and that associated with another channel to memory device 40b'. The two-channel buried audio signal is written into the respective analog memories 40a' and 40b' at the frequency of the high-speed clocking signals $S_H$ and is thereafter read out therefrom at the frequency of the low-speed clocking signals $S_L$, to provide a respective two substantially continuous audio signals through filter and amplifiers 41a' and 41b' to an audio processor 44'. In this illustrated embodiment, the first and second buried audio signals represent sum L+R and difference L−R components of a stereo signal, audio processor 44' includes a matrixing circuit to transform the sum and difference signals into a left L and right R stereo channel to be provided to amplifiers 45a' and 45b' and thence to output transducers 46a' and 46b', respectively.

It is apparent that the encoding and decoding circuits of FIGS. 7 and 8 can be used for encoding and decoding audio signals other than stereo signals, for instance, for including commentary in different languages in the case of a multiple-language video program.

Figure 9:
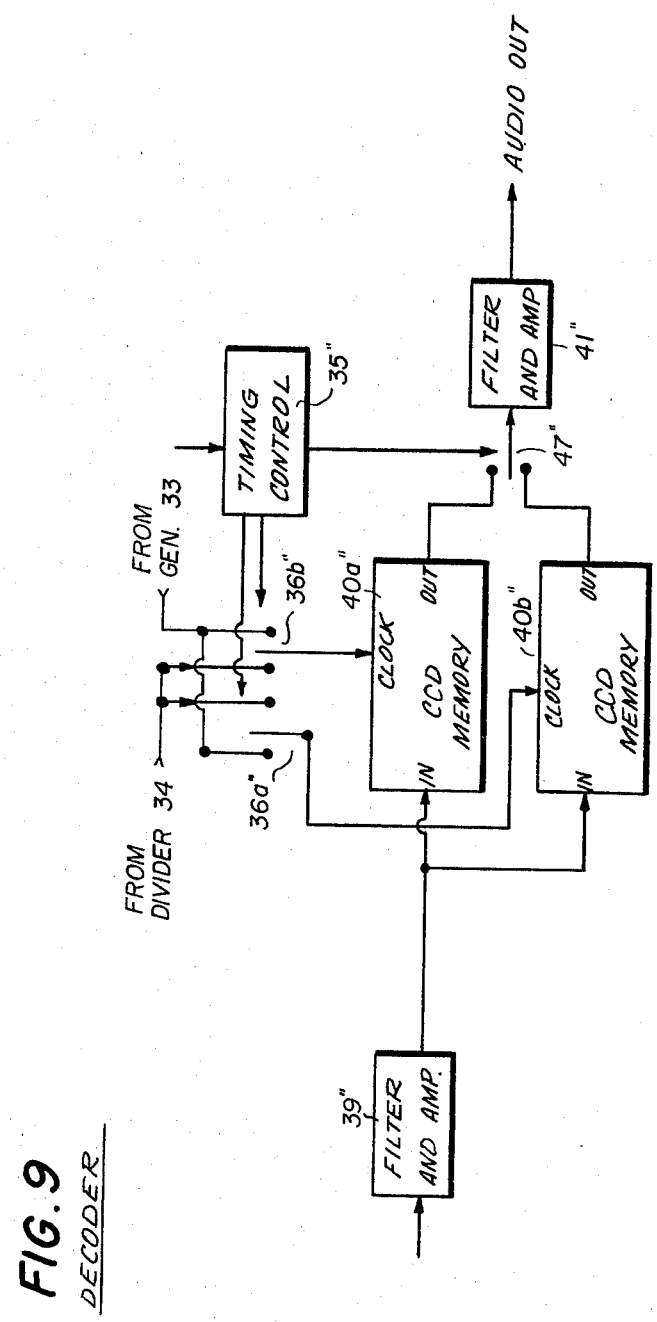
FIG. 9 shows an alternative arrangement of a portion of the circuit shown in FIG. 2.

FIG. 9 shows a two-memory arrangement, representing a portion of the arrangement of FIG. 2, in which similar elements are identified with the same reference numerals, but double-primed, and a detailed description thereof is omitted. The arrangement of FIG. 9 is useful in eliminating the 52.2 μs gaps that occur in the audio output signal as shown in FIG. 4F.

In the arrangement of FIG. 9, first and second analog memories 40a" and 40b" are each coupled to filter and amplifier 39" to receive the buried audio signal, and clock rate control circuit 35" controls switches 36a" and 36b" to furnish clocking signals to first and second analog memories 40a" and 40b", respectively. The timing of switch 36a" and that of switch 3b" are different from one another, for instance, at the field rate. An output switch 47" is coupled to the outputs of memories 40a" and 40b" and is also controlled by clock rate control circuit 35" so that the audio signals read out from memories 40a" and 40b" are provided alternately from one and then from the other of the memories 40a" and 40b" to filter and amplifier 41".

In order to avoid the 52.2 μs gaps, a slightly higher dividing ratio is used in divider 34 to provide a slightly lower frequency for the low-speed clocking signals $S_L$. For instance, divider 34 can have ratio of 320 rather than 318 to provide a low-speed clocking signal frequency of 54.47 KHz, rather than the 54.82 KHz used in the embodiments of FIGS. 1–8. While this results in a slight lowering of the frequency of the output audio signal, such lowering represents a frequency change of well below 1%. Since a musical half-tone represents a frequency change of about 6%, any frequency error introduced by the arrangement of FIG. 9 would not be perceptible to a listener's ear.

While in the foregoing arrngements an analog memory device, such as a CCD shift register, has been used, a memory arrangement including a digital memory and associated A/D and D/A converters could likewise be used. Complementary digital-memory arrangements for encoding and decoding the audio signal are illustrated in FIGS. 10 and 11, respectively.

In encoding arrangement of FIG. 10, an audio input is applied to an A/D converter 71 for converting the analog signal to digital form, and the video input is provided to a horizontal period detector 72 for detecting the occurrence of a selected line-scanning period. Horizontal period detector 72 controls the rate of a high/low frequency clock generator 73. A data bus 74 couples A/D converter 71 to a digital memory 75 which is controlled by an address counter 76. Digital memory 75 is also coupled by data bus 74 to a D/A converter 77 which converts the digital signal read out from memory 75 to analog form.

Before the occurrence of the selected line-scanning period, horizontal period detector 72 selects the write mode of memory 75, enables operation of A/D converter 71, and selects low-speed clocking signals from clock generator 73 to be applied to a sample input of A/D converter 71, and to a clock input of address counter 76. Thus, during the 16.6 ms period between occurrences of the selected line-scanning periods, a digital representation of the audio input signal is written into memory 75 at a low-speed clocking rate.

Upon the occurrence of the selected line-scanning period, detector 72 selects the read mode of memory 75, enables operation of D/A converter 77, resets address counter 76, and causes clock generator 73 to provide high-speed clocking signals to address counter 76 and to D/A converter 77. Thus, during the selected line-scanning period, the digital representation of the audio input signal representing substantially a one field period is read out from digital memory 75 and is converted in D/A converter 77 to analog form at the rate of the high-frequency clocking signal to provide a time-compressed audio signal. A video output switch 78, which functions in a fashion equivalent to that of switch 23 to FIG. 1, injects the time-compressed audio signal from D/A converter 77 as a buried audio signal into the selected line-scanning period of the video signal.

The arrangement shown in FIG. 11 operates in a fashion complementary to that of the arrangement of FIG. 10. An input video signal containing a time-compressed audio signal as a buried audio signal in a selected line-scanning period thereof is applied to an A/D converter 81 and to a horizontal period detector 82. When the occurrence of the selected line-scanning period is detected, detector 82 causes a high/low rate clocking circuit 83 to provide high-speed clocking signals. During the remainder of the line-scanning periods of each field, detector 82 causes clocking circuit 83 to provide low-frequency clocking signals. A data bus 84 couples A/D converter 81 to a digital memory 85 which is controlled by an address counter 86. Data bus 84 also couples memory 85 to a D/A converter 84 which provides an audio output signal therefrom.

When the selected line-scanning period is detected, detector 82 enables A/D converter 81, resets address counter 86, and sets memory 85 into its write mode. Then, high-speed clocking signals are provided to A/D converter 81 and to address counter 86, and the buried audio signal is written at high speed into digital memory 85. Then, after the selected line-scanning period, detector 82 sets digital memory 85 into its read mode, and enables D/A converter 87. Clocking circuit 83 then provides low-frequency clocking pulses to address counter 86 and to D/A converter 87, so that the buried audio signal is read out from the digital memory 85 during the remainder of the line-scanning periods as a substantially continuous analog audio signal.

It is apparent that many possible variations of the signal processing circuit according to this invention are possible without departing from the spirit of the present invention. For example, two or more of the unused line-scanning periods in each field period of the video signal could be used to contain the buried time-compressed audio signal thereby increasing the transmission bandwidth for the audio signal, and hence increasing the audio fidelity. Further, the present invention could be practiced in conjunction with a video disc to eliminate the need for separate sound channel. Also, the present invention could be practiced with a video system for the purpose of including special features. Additionally, the present invention could be favorably applied to a pay or subscription TV system to encode the audio signal so that standard receivers would be unable to reproduce the sound portion of the television programs. Further, as the present invention eliminates the need for a separate audio subcarrier, the present invention can be applied favorably to microwave or satellite transmission systems to narrow the bandwidth thereof and thereby enable such systems to carry a greater density of channels. Many further improvements and variations will occur to those skilled in the art without departing from the scope and spirit of the present invention, which is to be ascertained from the appended claims.

I claim as my invention:

1. A circuit for processing a composite video signal formed of a video signal having a series of field periods each constituted by a sequence of line-scanning periods and of a buried audio signal occurring in at least one selected line-scanning period of at least certain field periods; comprising:

audio channel means for receiving and processing said buried audio signal to yield a substantially continuous audio signal, including first memory means into which said buried audio signal is written and from which said substantially continuous audio signal is thereafter read out at a speed depending on the frequency of a clocking signal applied thereto, second memory means into which said buried audio signal is written and from which said substantially continuous audio signal is read out at a speed depending on the frequency of a clocking signal applied thereto, and selecting means for selecting said first and said second memory means to provide said continuous output signal so that the latter is free of gaps corresponding to the times of said selected line-scanning periods;

clocking signal generating means for generating a first clocking signal at a first clocking frequency and a second clocking signal at a second, higher clocking frequency; and clock control means for selectively applying said second clocking signal to said first and second memory means during said at least one selected line-scanning period and for selectively applying said first clocking signal to said first and second memory means during the remainder of said line-scanning periods, so that said buried audio signal is written into said first and second memory means at said second clocking frequency during said at least one selected line-scanning period and the written-in buried audio signal is read out of said memory means during substantially all of each field period to yield said substantially continuous audio signal.

2. A circuit for processing a composite signal according to claim 1, wherein said at least one selected line-scanning period occurs during the vertical blanking portion of each said field period, and said first and second clocking frequencies are selected substantially in the ratio of the field period duration to the line-scanning period duration.

3. A circuit for processing a composite signal according to claim 1, wherein said line-scanning periods have a blanking portion and a line-scanning portion and said buried audio signal occurs in the line-scanning portion of said at least one selected line-scanning period, and wherein said first and second clocking frequencies are selected in a ratio smaller than the ratio of the duration of the line-scanning portion of said at least one selected line scanning period to the duration of the remainder of said line-scanning period of each field period.

4. A circuit for processing a composite signal according to claim 3, wherein said first and second clocking frequencies are selected in the ratio of said line-scanning portion to said field period.

5. A circuit for processing a composite signal according to claim 1, wherein said memory means includes an analog shift register.

6. A circuit for processing a composite signal according to claim 5, wherein said analog shift register includes an input terminal to which said buried audio signal is applied, a clock input to which said first and second clocking signals are selectively applied, and an output terminal at which the read-out audio signal appears.

7. A circuit for processing a composite signal according to claim 1, wherein said clock control means includes means for detecting the occurrence of said selected line-scanning period in said video signal; and selecting means for selecting said second clocking signal upon the detected occurrence of said selected line-scanning period and for selecting said first clocking signal at the end of said selected line-scanning period.

8. A circuit for processing a composite signal according to claim 7, wherein said selecting means includes a counter operative to count the occurrences of said second clocking signal and to switch over said selecting means to select said second clocking signal when a predetermined number of such occurrences have been counted.

9. A circuit for processing a composite signal according to claim 1, wherein said buried audio signal represents a multiple-channel signal intended for a plurality of audio signal channels, and said memory means includes a plurality of memory devices each associated with a respective audio signal channel.

10. A circuit for processing a composite signal according to claim 9, wherein said buried audio signal includes a plurality of buried audio signal components corresponding respectively to said plurality of audio channels and each of which is associated with a respective different selected line-scanning period in each said field period, and said clock control means applies said second clocking signal to each said memory device during the respective selected line-scanning period associated therewith.

11. A circuit for processing a composite signal according to claim 10, wherein said buried audio signal represents a stereo signal having left-channel and right-channel components and one of said buried audio signal components is a sum stereo component while another of said buried audio signal components is a difference stereo signal component, said sum and difference stereo components being written into said memory means at said second clocking frequency and being read out therefrom at said first clocking frequency, and wherein said audio channel means further includes audio processing circuit means for transforming the read out sum and difference stereo components to said left-channel and right-channel components.

12. A circuit for processing a composite signal according to claim 1, wherein said memory means included A/D converting means for converting said buried audio signal to digital form at said second clocking frequency during said selected line scanning periods; a digital memory device having a plurality of memory locations for storing the converted audio signal; means for enabling said digital memory device to write said converted buried audio signal into said memory locations at said second clocking frequency during said at least-on selected line-scanning period and to read the written-in converted signal from said memory locations at said first clocking frequency during said remainder of said line scanning periods; and D/A converting means for reconverting the read-out converted signal to analog form at said first clocking frequency.

13. A circuit for processing a composite signal according to claim 1, further comprising a video channel for processing said video signal, said video channel including delay means for imparting a delay of one field period to said video signal.

14. A circuit for processing a composite signal according to claim 1, wherein each of said first and second memory means includes first and second memory devices each operative to write in said buried audio signal during respective first and second selected line-scanning periods of each said field period.

15. A circuit for processing a composite signal according to claim 1, wherein said clock control means applies said second clocking signal to said first memory means only during alternate field periods and to said second memory means only during the remaining field periods.

16. A circuit for processing a composite signal according to claim 15, wherein said selecting means selects said second memory means having said alternate field periods and said first memory means during said remaining field periods.

* * * * *